(12) United States Patent
Ring et al.

(10) Patent No.: US 10,801,342 B2
(45) Date of Patent: Oct. 13, 2020

(54) STATOR ASSEMBLY FOR A GAS TURBINE ENGINE

(71) Applicant: UNITED TECHNOLOGIES CORPORATION, Hartford, CT (US)

(72) Inventors: Mark David Ring, Cape Neddick, ME (US); Scot A Webb, Gales Ferry, CT (US); Mark J Rogers, Kennebunk, ME (US); Gerald D Cassella, North Berwick, ME (US); Charles H Warner, South Portland, ME (US); Eric A Kuehne, Lyman, ME (US); Jonathan J Earl, Wells, ME (US); Matthew M Zietala, York, ME (US); Neil L Tatman, Brentwood, NH (US); Randall J Butcher, Newington, CT (US); Matthew R Willett, Portsmouth, NH (US); Nicholas R Leslie, South Berwick, ME (US)

(73) Assignee: Raytheon Technologies Corporation, Farmington, CT (US)

(*) Notice: Subject to any disclaimer, the term of this patent is extended or adjusted under 35 U.S.C. 154(b) by 752 days.

(21) Appl. No.: 14/644,596

(22) Filed: Mar. 11, 2015

(65) Prior Publication Data
US 2015/0292342 A1 Oct. 15, 2015

Related U.S. Application Data

(60) Provisional application No. 61/977,746, filed on Apr. 10, 2014.

(51) Int. Cl.
*F01D 9/04* (2006.01)
*F01D 25/24* (2006.01)

(52) U.S. Cl.
CPC ............ *F01D 9/041* (2013.01); *F01D 9/042* (2013.01); *F01D 25/246* (2013.01); *F05D 2220/32* (2013.01); *F05D 2230/61* (2013.01); *F05D 2240/12* (2013.01); *F05D 2240/80* (2013.01); *Y02T 50/672* (2013.01)

(58) Field of Classification Search
CPC ........ F01D 9/041; F01D 9/042; F01D 25/246; F05D 2240/12; F05D 2240/80; F05D 2230/61; Y10T 29/49323; Y10T 29/49321
USPC .... 415/189–190, 209.2, 209.3, 209.4, 210.1, 415/138, 139; 29/889.21, 889.22
See application file for complete search history.

(56) References Cited

U.S. PATENT DOCUMENTS 4,639,189 A * 1/1987 Rosman .................. F01D 9/041
   415/115
5,743,711 A * 4/1998 Fournier ............... F01D 5/3015
   415/209.2

(Continued)

FOREIGN PATENT DOCUMENTS

WO     2014022065 A1     2/2014

*Primary Examiner* — Christopher Verdier
(74) *Attorney, Agent, or Firm* — Bachman & LaPointe, P.C.

(57) ABSTRACT

A vane cluster for a gas turbine engine includes a first end-of-cluster vane, a second end-of-cluster vane, a neighbor vane adjacent to the second end-of-cluster vane at an interface that includes an angled load interface therebetween; and a multiple of base vanes between the first end-of-cluster vane and the neighbor vane, the angled load interface different than an interface between each of the multiple of base vane.

23 Claims, 10 Drawing Sheets

(56) References Cited

U.S. PATENT DOCUMENTS

| | | | | |
|---|---|---|---|---|
| 5,752,804 | A | * | 5/1998 | Benoist ................. F01D 25/246 415/209.2 |
| 2006/0177314 | A1 | * | 8/2006 | Yamashita ............... F01D 5/225 416/219 R |
| 2010/0068050 | A1 | * | 3/2010 | Hansen ................... F01D 9/042 415/209.3 |
| 2013/0209249 | A1 | * | 8/2013 | Langlois ................. F01D 9/042 415/209.3 |
| 2013/0302151 | A1 | * | 11/2013 | Ring .................... F01D 25/246 415/191 |
| 2014/0037442 | A1 | * | 2/2014 | Tatman .................. F01D 9/042 415/208.1 |
| 2014/0060081 | A1 | | 3/2014 | Earl et al. |
| 2014/0093363 | A1 | | 4/2014 | Ring et al. |
| 2015/0139790 | A1 | * | 5/2015 | Burdgick ................ F01D 9/042 415/210.1 |

\* cited by examiner

STATOR ASSEMBLY FOR A GAS TURBINE ENGINE

CROSS REFERENCE TO RELATED APPLICATION

This application claims the benefit of provisional application Ser. No. 61/977,746, filed Apr. 10, 2014.

BACKGROUND

The present disclosure relates to a gas turbine engine and, more particularly, to a stator assembly.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The compressor section includes a case circumscribing an engine axis and axially alternating arrays of stationary vanes and rotatable blades. Each vane array may be constructed of multiple vane clusters distributed circumferentially about the interior of the case with each cluster being supported by the case. Some vane arrays include clusters of cantilevered vanes.

As each vane may be individually retained and anti-rotated in the engine module assembly, relatively complicated assembly tools are often utilized. Although effective, such tooling may be relatively expensive and labor intensive.

SUMMARY

A vane cluster for a gas turbine engine includes a first end-of-cluster vane, a second end-of-cluster vane, a neighbor vane adjacent to the second end-of-cluster vane at an interface that includes an angled load interface therebetween; and a multiple of base vanes between the first end-of-cluster vane and the neighbor vane, the angled load interface different than an interface between each of the multiple of base vane.

A further embodiment of the present disclosure includes, wherein the second end-of-cluster vane includes an anti-rotation lug.

A further embodiment of any of the foregoing embodiments of the present disclosure includes, wherein the anti-rotation lug radially extends from an outer platform.

A further embodiment of any of the foregoing embodiments of the present disclosure includes, wherein the anti-rotation lug extends from a forward hook of the outer platform.

A further embodiment of any of the foregoing embodiments of the present disclosure includes a forward wear liner along an outer platform of each of the first end-of-cluster vane, the second end-of-cluster vane, the neighbor vane and the multiple of base vanes.

A further embodiment of any of the foregoing embodiments of the present disclosure includes an aft wear liner along the outer platform of each of the first end-of-cluster vane, the second end-of-cluster vane, the neighbor vane and the multiple of base vanes.

A further embodiment of any of the foregoing embodiments of the present disclosure includes, wherein the first end-of-cluster vane includes a forward lug and an aft lug to respectively engage the forward wear liner and the aft wear liner.

A further embodiment of any of the foregoing embodiments of the present disclosure includes an angled load interface between the neighbor vane and the second end-of-cluster vane.

A further embodiment of any of the foregoing embodiments of the present disclosure includes, wherein the angled load interface of the second vane is arranged from an intermediate axial position toward the neighbor vane.

A further embodiment of any of the foregoing embodiments of the present disclosure includes, wherein the angled load interface of the second vane is arranged from an intermediate axial position toward a leading edge of the neighbor vane.

A vane cluster for a gas turbine engine according to another disclosed non-limiting embodiment of the present disclosure includes a first end-of-cluster vane; a second end-of-cluster vane including an anti-rotation lug; a neighbor vane adjacent to the second end-of-cluster vane at an interface that includes an angled load interface therebetween; and a multiple of base vanes between the first end-of-cluster vane and the neighbor vane.

A further embodiment of any of the foregoing embodiments of the present disclosure includes, wherein an interface between each of the multiple of base vanes are identical.

A further embodiment of any of the foregoing embodiments of the present disclosure includes, wherein an interface between one of the multiple of base vanes and the first end-of-cluster vane is identical to the interface between each of the multiple of base vanes.

A further embodiment of any of the foregoing embodiments of the present disclosure includes, wherein an interface between one of the multiple of base vanes and the neighbor vane is identical to the interface between each of the multiple of base vanes.

A further embodiment of any of the foregoing embodiments of the present disclosure includes a forward wear liner along an outer platform of each of the first end-of-cluster vane, the second end-of-cluster vane, the neighbor vane and the multiple of base vanes; and an aft wear liner along the outer platform of each of the first end-of-cluster vane, the second end-of-cluster vane, the neighbor vane and the multiple of base vanes.

A method of assembling a multiple of vanes into a gas turbine engine according to another disclosed non-limiting embodiment of the present disclosure includes positioning a neighbor vane adjacent to a second end-of-cluster vane at an angled interface that includes an angled load interface therebetween such that a multiple of base vanes are positioned between a first end-of-cluster vane and the neighbor vane; and anti-rotating the second end-of-cluster vane such that the neighbor vane is loaded axially with respect to the second end-of-cluster vane and at least one of the multiple of base vanes.

A further embodiment of any of the foregoing embodiments of the present disclosure includes anti-rotating the second end-of-cluster vane via an anti-rotation lug that extends radially from a forward hook of an outer platform.

A further embodiment of any of the foregoing embodiments of the present disclosure includes retaining each of the neighbor vane, the first end-of-cluster vane, the second end-of-cluster vane, and the multiple of base vanes as a vane cluster.

A further embodiment of any of the foregoing embodiments of the present disclosure includes mounting the vane cluster within a ring case.

A further embodiment of any of the foregoing embodiments of the present disclosure includes mounting the first end-of-cluster vane of a first vane cluster adjacent to a second end-of-cluster vane of a second vane cluster.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
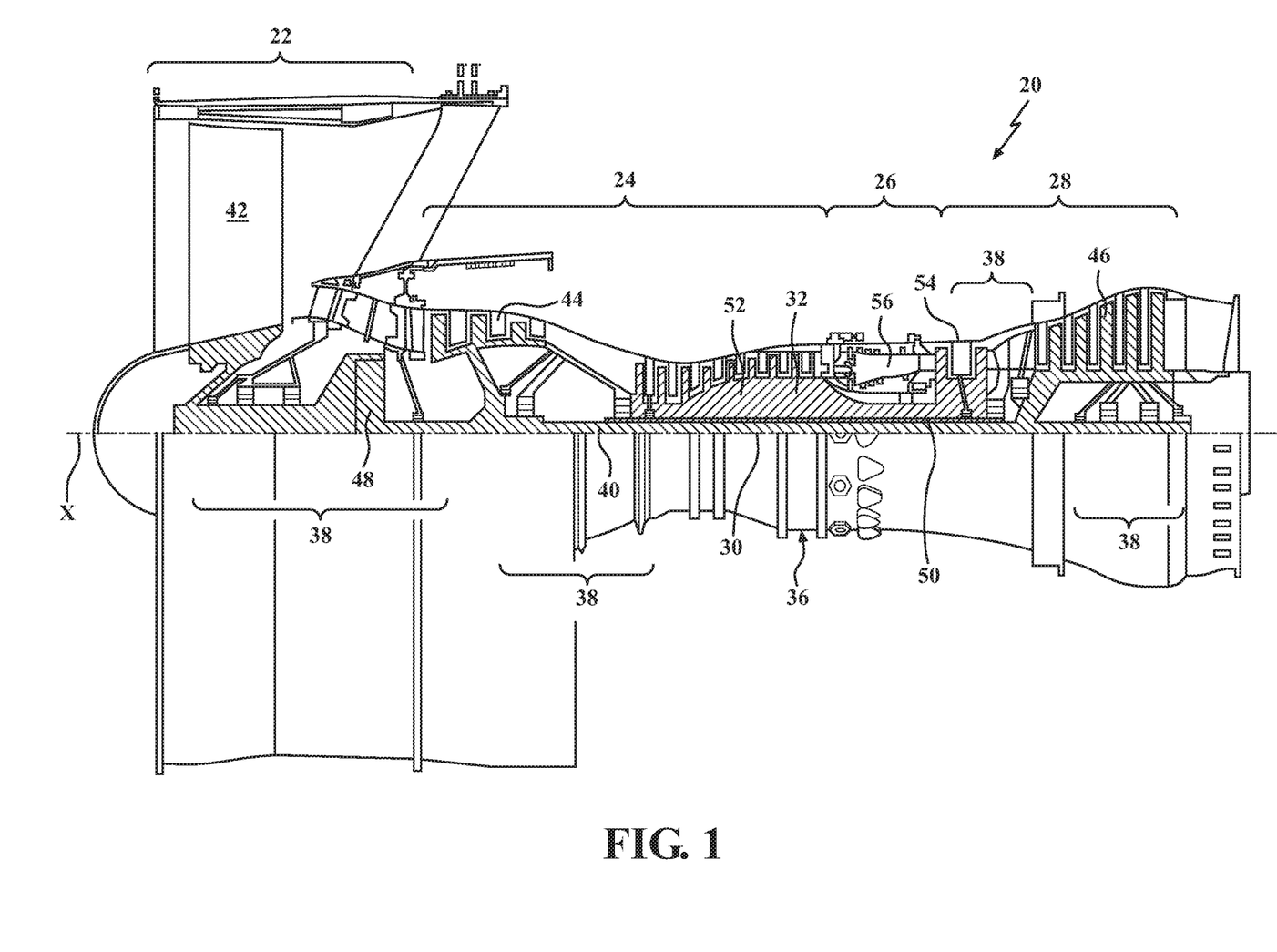
FIG. 1 is a schematic cross-section of an example gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan (FIG. 2), turbojets, turboshafts, and three-spool (plus fan) turbofans.

The engine 20 generally includes a low spool 30 and a high spool 32 mounted for rotation about an engine central longitudinal axis X relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

The HPC 52 includes a multiple of stages with alternate stationary vane arrays 60 and rotational rotor assemblies 62 along an airflow passage 64. Although the HPC 52 is illustrated in the disclosed non-limiting embodiment, other engine sections will also benefit herefrom. Moreover, although a particular number of stages are illustrated, it should be appreciated that any number of stages will benefit herefrom.

Figure 2:
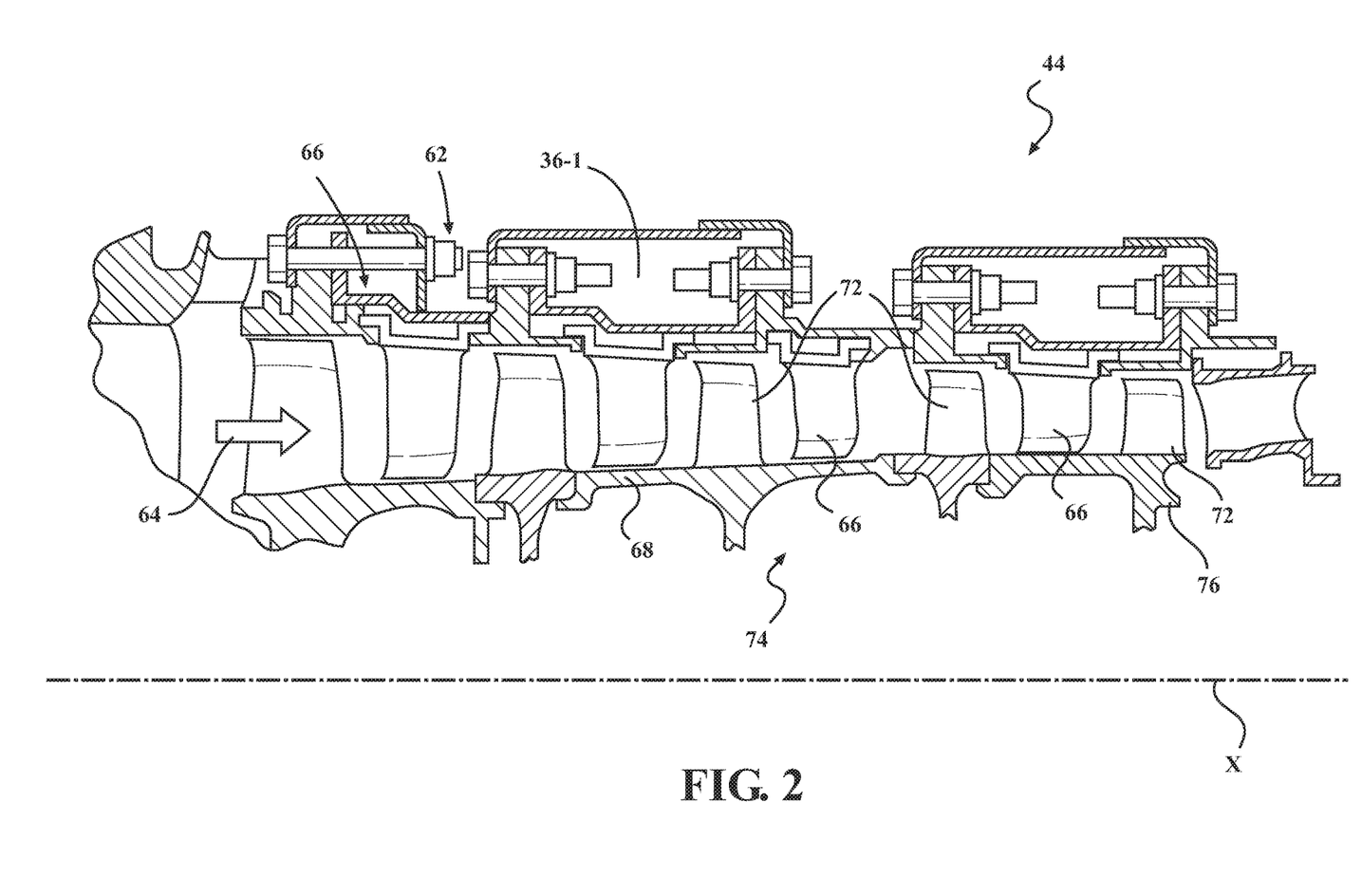
FIG. 2 is a schematic expanded cross-section of a portion of an engine case with a multiple of cantilevered mounted stator vane airfoils of a multiple of vane clusters.
Figure 3:
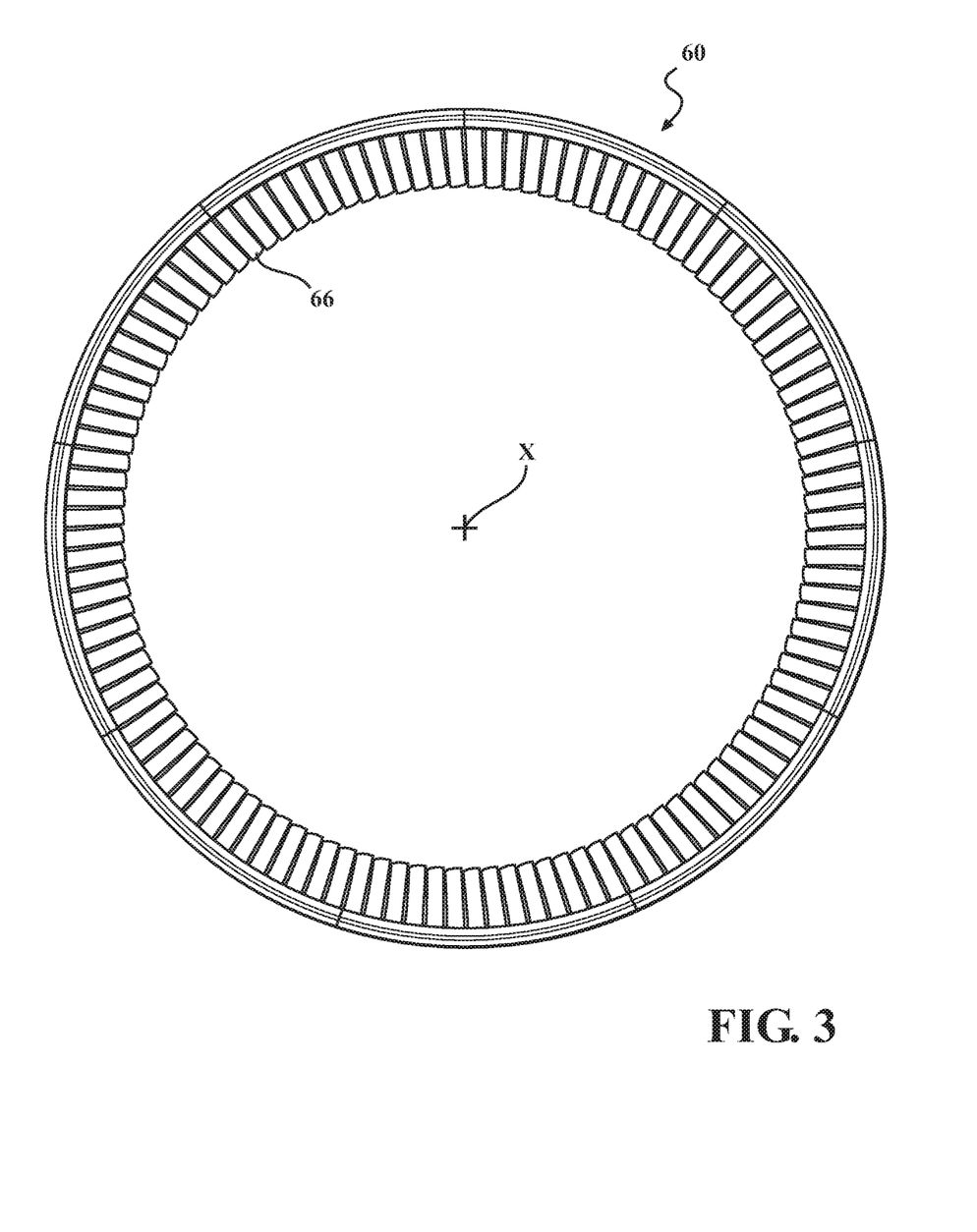
FIG. 3 is a front view of a vane array with a multiple of cantilevered mounted stator vane airfoils of a multiple of vane clusters.

With reference to FIG. 2, each vane array 60 (also shown in FIG. 3) includes a multiple of cantilevered mounted stator vane airfoils 66 that extend in a cantilever manner from an outer platform 68 toward the engine central longitudinal axis X. The outer platform 68 is mounted to the engine static structure 36 such as a ring case 36-1 via, for example, segmented hooks or other interfaces. Each vane array 60 may be formed of a multiple of vane clusters 70 (FIG. 4) each with a multiple of cantilevered mounted stator vane airfoils 66. It should be understood that various numbers of cantilevered mounted stator vane airfoils 66 and vane clusters 70 will benefit herefrom.

Each of the rotor assemblies 62 includes a multiple of blades 72 supported by a respective rotor hub 74. The outer platform 68 and airfoils 66 of the vane arrays 60 and a platform 76 that extends from each of the multiple of blades 72 generally bounds the airflow passage 64. The multiple of cantilevered mounted stator vane airfoils 66 extend in a cantilever manner from the ring case 36-1 such that the cantilevered mounted stator vane airfoils 66 extend toward the engine axis X to be disposed in close proximity to the rotor hub 74. Provision for close clearances between the cantilevered mounted stator vane airfoils 66 and the rotor hub 74 increases engine efficiency.

Figure 4:
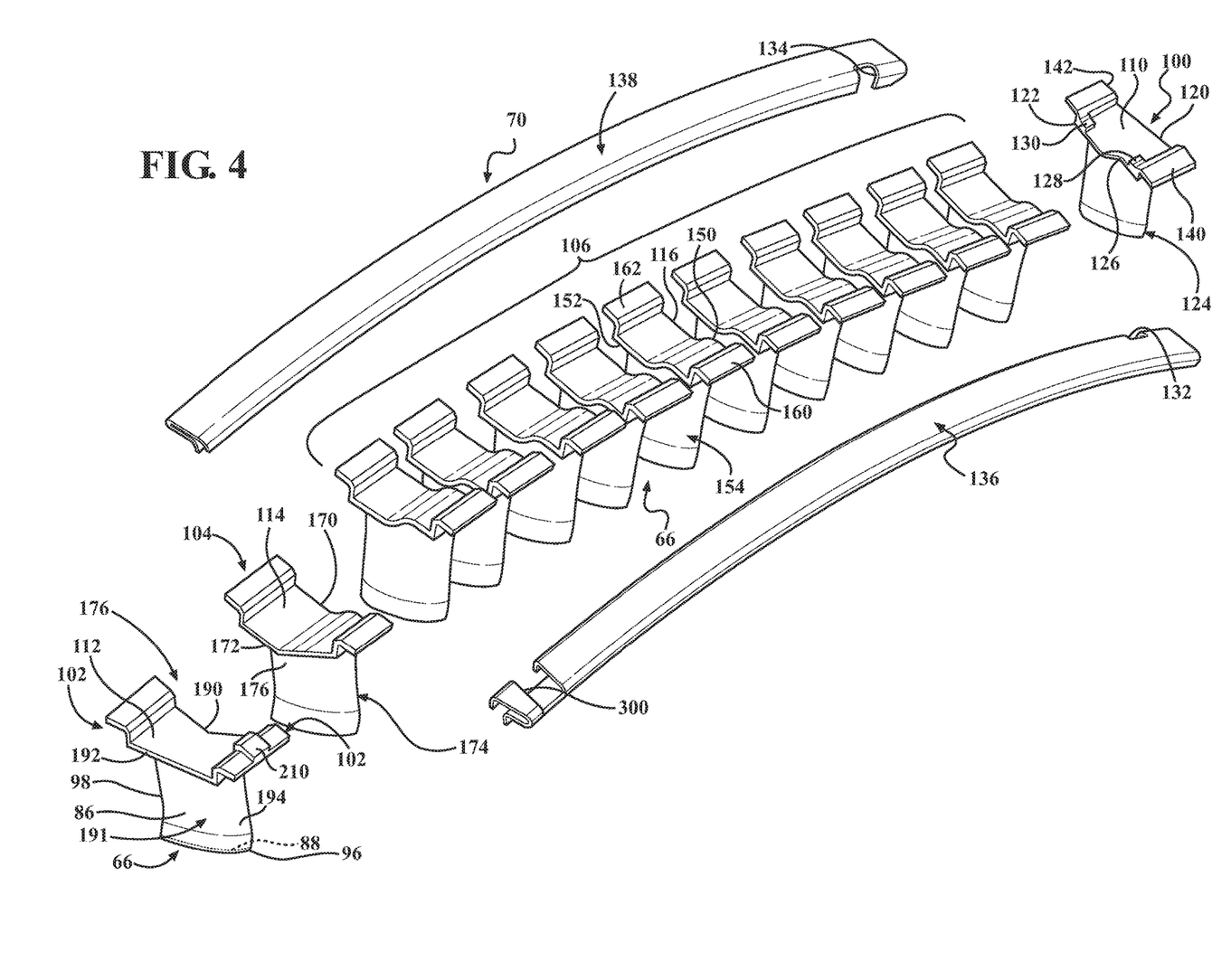
FIG. 4 is an exploded view of a vane cluster according to one disclosed non-limiting embodiment.

With reference to FIG. 4, each cantilevered mounted stator vane airfoil 66 includes a first sidewall 86 that may be convex and defines a suction side, and a second sidewall 88 that may be concave and define a pressure side of the cantilevered mounted stator vane airfoils 66. Sidewalls 86, 88 are joined at the leading edge 96 and at an axially spaced trailing edge 98. More specifically, the airfoil trailing edge 98 is spaced chordwise and downstream from the airfoil leading edge 96. The sidewall 86 and sidewall 88, respectively, extend longitudinally or radially outward in span from an airfoil root to a tip. Each vane cluster 70 may be manufactured from a metallic alloy such as, but not limited to, titanium or a composite material.

Figure 5:
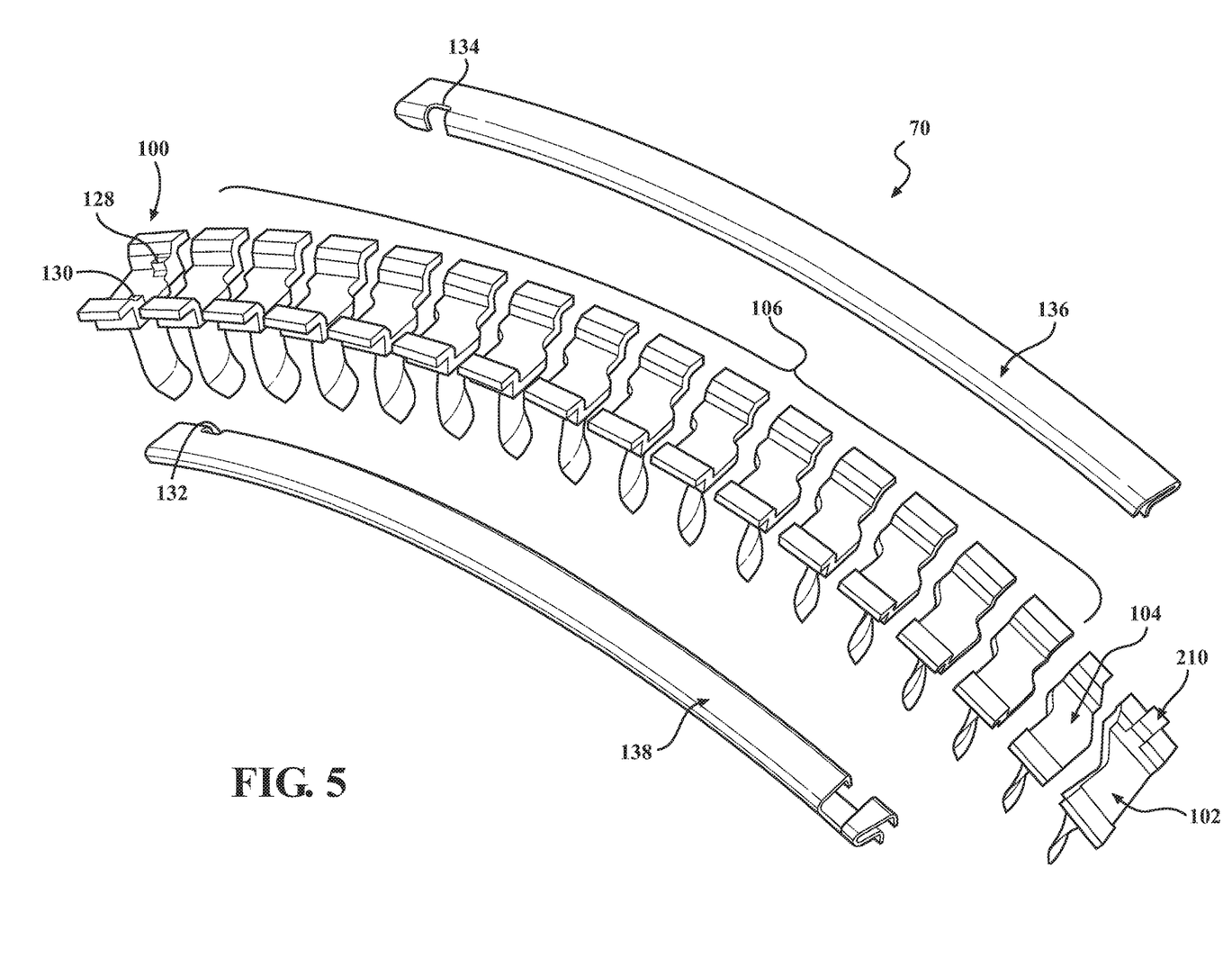
FIG. 5 is a rear perspective view of a vane cluster.
Figure 6:
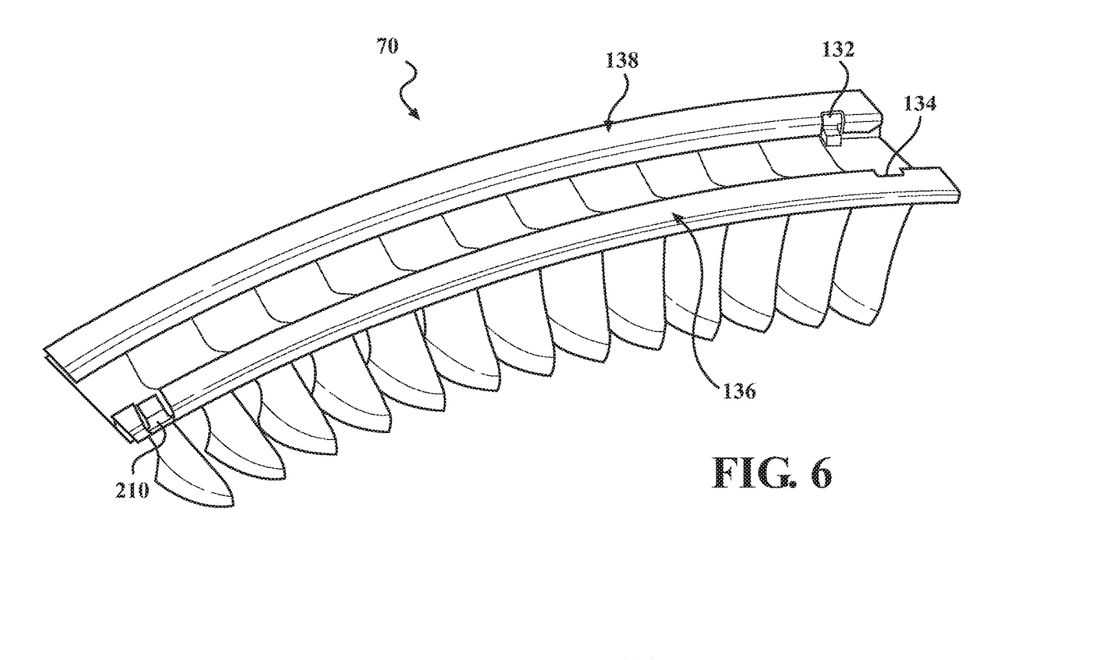
FIG. 6 is a front perspective view of a vane cluster.

The vane cluster 70 includes a first end-of-cluster vane 100, a second end-of-cluster vane 102, a neighbor vane 104 adjacent to the second end-of-cluster vane 102 and a multiple of base vanes 106 between the first end-of-cluster vane 100 and the neighbor vane 104 (shown from a trailing edge in FIG. 5 and assembled in FIG. 6).

The first end-of-cluster vane 100 includes a first vane outer platform 110, the second end-of-cluster vane 102 includes a second vane outer platform 112, the neighbor vane 104 includes a neighbor vane outer platform 114 and each of the multiple of base vanes 106 include a respective base vane outer platform 116.

The first vane outer platform 110 includes a pressure side edge 120 and a suction side edge 122 as defined with respect to the airfoil 124. The pressure side edge 120 in this embodiment is straight, although the straight edge may be raked with respect to the engine axis A, and the suction side edge 122 provides an interface 126 with one of the multiple of base vane outer platforms 116. The suction side edge 122 defines a generally serpentine or essentially flattened "S" geometry.

The first vane outer platform 110 further include radially extending lugs 128, 130 that are operable to receive slots 132, 134 within a respective forward wear liner 136 and an aft wear liner 138 that fits to a respective forward hook 140 and the aft hook 142. The forward hook 140 and the aft hook 142 are radially displaced lengths of the first vane outer platform 110.

The base vane outer platform 116 includes a pressure side edge 150 and a suction side edge 152 as defined with respect to the airfoil 154. The edges 150, 152 each defines a generally serpentine or essentially flattened "S" geometry that correspond with the first vane outer platform suction side edge 122 to correspond with the interface 126. That is, the edges 150, 152 each define the base vane side of the interface 126. That is, the interface 126 between one of the multiple of base vane outer platforms 116 and the first vane outer platform 110 is identical to the interface between each of the multiple of base vanes 106. Accordingly, any number of base vanes 106 may be provided to define a desired arc length of the vane cluster 70, here ten (10) are illustrated. Each base vane outer platform 116 includes a respective forward hook 160 and an aft hook 162 that corresponds with the forward hook 140 and the aft hook 142.

The neighbor vane outer platform 114 includes a pressure side edge 170 and a suction side edge 172 as defined with respect to the airfoil 174. The neighbor vane 104 suction side edge 172 corresponds with the interface 126 to interface with the last base vane outer platform 116. That is, the neighbor vane 104 suction side edge 172 is different than the pressure side edge 170.

The suction side edge 172 of the neighbor vane outer platform 114 includes an angled load interface 176 (FIG. 7—axial offset shown exaggerated) arranged from an intermediate axial position 178 toward the neighbor vane outer platform 114. That is, the forward hook 180 of the neighbor vane outer platform 114 is circumferentially shorter than an aft hook 182 of the neighbor vane outer platform 114. The neighbor vane outer platform 114 forward hook 180 and the aft hook 182 corresponds with the forward hook 140, 160 and the aft hook 142, 162.

The second vane outer platform 112 includes a pressure side edge 190 and a suction side edge 192 as defined with respect to the airfoil 194. The second vane outer platform 112 suction side edge 192 in this embodiment is straight, although the straight edge may be raked with respect to the engine axis A to match the edge of an adjacent vane cluster 70.

Figure 7:
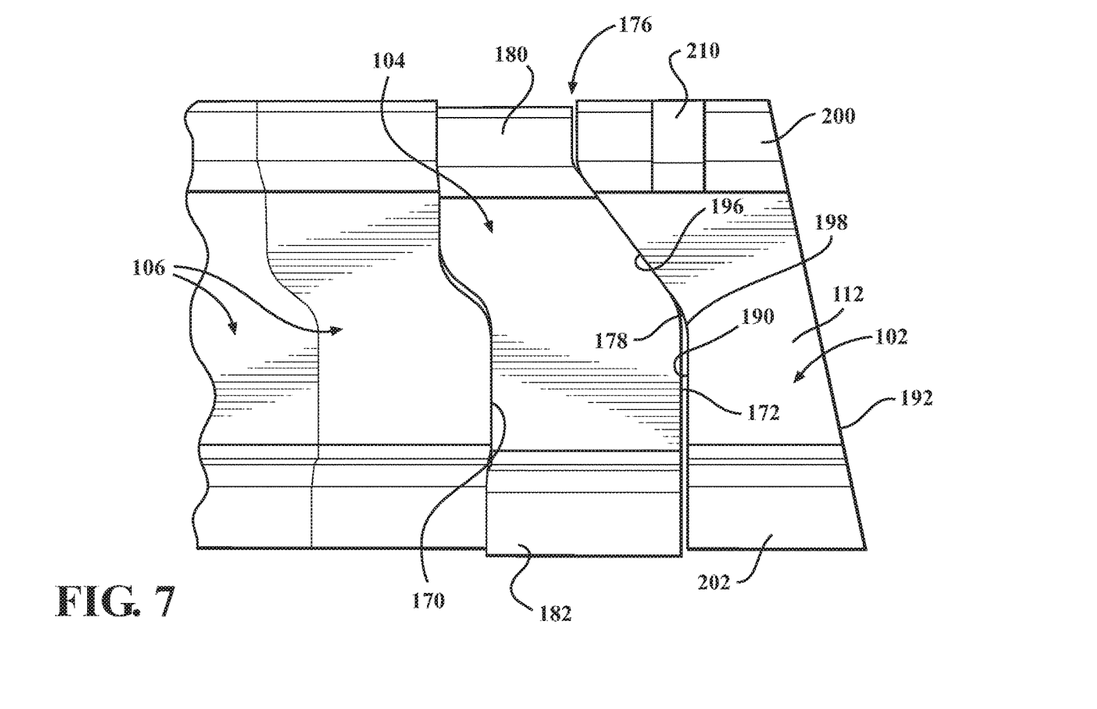
FIG. 7 is a top view of a portion of a vane cluster with a neighbor vane shifted in a schematically exaggerated manner.

The pressure side edge 190 includes an angled load interface 196 that corresponds with the angled load interface 176 (FIG. 7—axial offset shown exaggerated). The angled load interface 196 is arranged from an intermediate axial position 198 toward the neighbor vane outer platform 114. That is, the forward hook 200 of the second vane outer platform 112 is circumferentially longer than an aft hook 202. The second vane outer platform 112 forward hook 200 and the aft hook 202 corresponds with the forward hook 140, 160, 180 and the aft hook 142, 162, 182.

Figure 8:
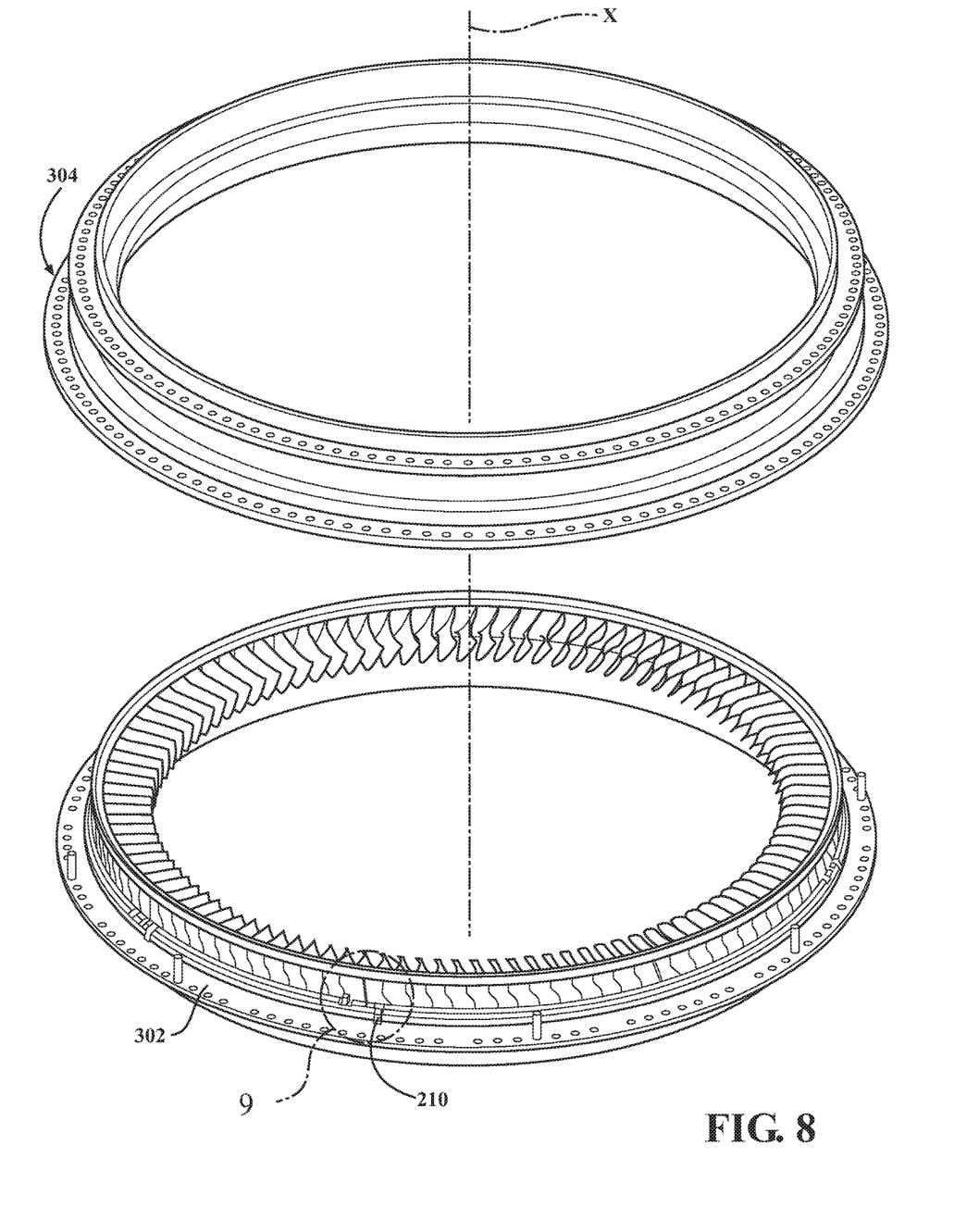
FIG. 8 is an exploded view of a portion of an engine case module with a multiple of vane clusters assembled therein.
Figure 9:
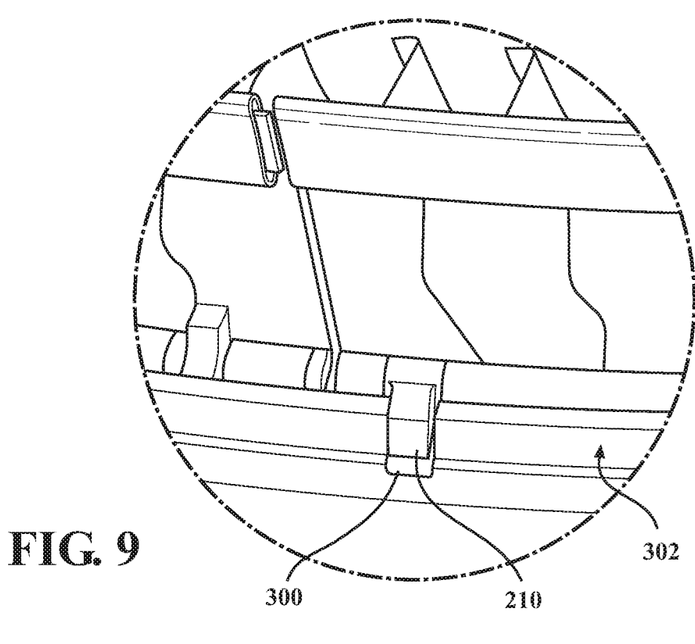
FIG. 9 is an expanded view of vane cluster interfaced with a forward ring case of the engine case module.

The forward hook 200 of the second vane outer platform 112 includes a radially extending anti-rotation lug 210 that interfaces with a corresponding anti-rotation slot 300 in a forward ring case 302 (FIGS. 8 and 9). The vane shroud geometry at the angled load interface 196 thereby transfers load to the anti-rotation features such that the position of each vane 100, 102, 104, 106 remains stable at the desired attitude when assembled.

The vanes load against the forward ring case 302 while the neighbor vane 104 reacts an axial load against an aft ring case 304 (FIG. 9) with the nominal airfoil axial location shifted to compensate to facilitate positional stability to the adjacent vanes. It should be appreciate that the nominal airfoil axial location shift is illustrated in an exaggerated manner in FIG. 7 and that the axial relationship may be otherwise. The anti-rotational loads and vibrational energy is thereby accommodated with axial movement of the neighbor vane 104 with respect to the second end-of-cluster vane 102 and at least one of the multiple of base vanes 106. The angled load interface 196 results in the axial movement that "squares up" the vanes 100, 102, 104, 106 in response to associated rotation with respect to the radially extending anti-rotation lug 210 under operation airflow loads. In other words, the loads accumulate on the angled load interface 196 that results in a stable position for each vane 100, 102, 104, 106.

The radially extending anti-rotation lug 210 on but one vane, rather than on the module case, further secures retention of all the vanes of each vane cluster 70 to improve cluster and module assembly. Location of the radially extending anti-rotation lug 210 on the forward hook further facilitates installation to the mating case slots prior to installation of the successive ring case.

The forward wear liner 136 and the aft wear liner 138 retain the individual vanes 100, 102, 104, 106 within a self-contained cluster to facilitate assembly as well as minimize wear thereof. That is, the forward wear liner 136 and the aft wear liner 138 permit the assembly of multiple vanes 100, 102, 104, 106 as a cartridge or cluster rather than the individual vane installation that readily facilitates assembly of, for example, eight vane clusters 70 per stage rather that individual installation of over one hundred separate vanes.

Figure 10:
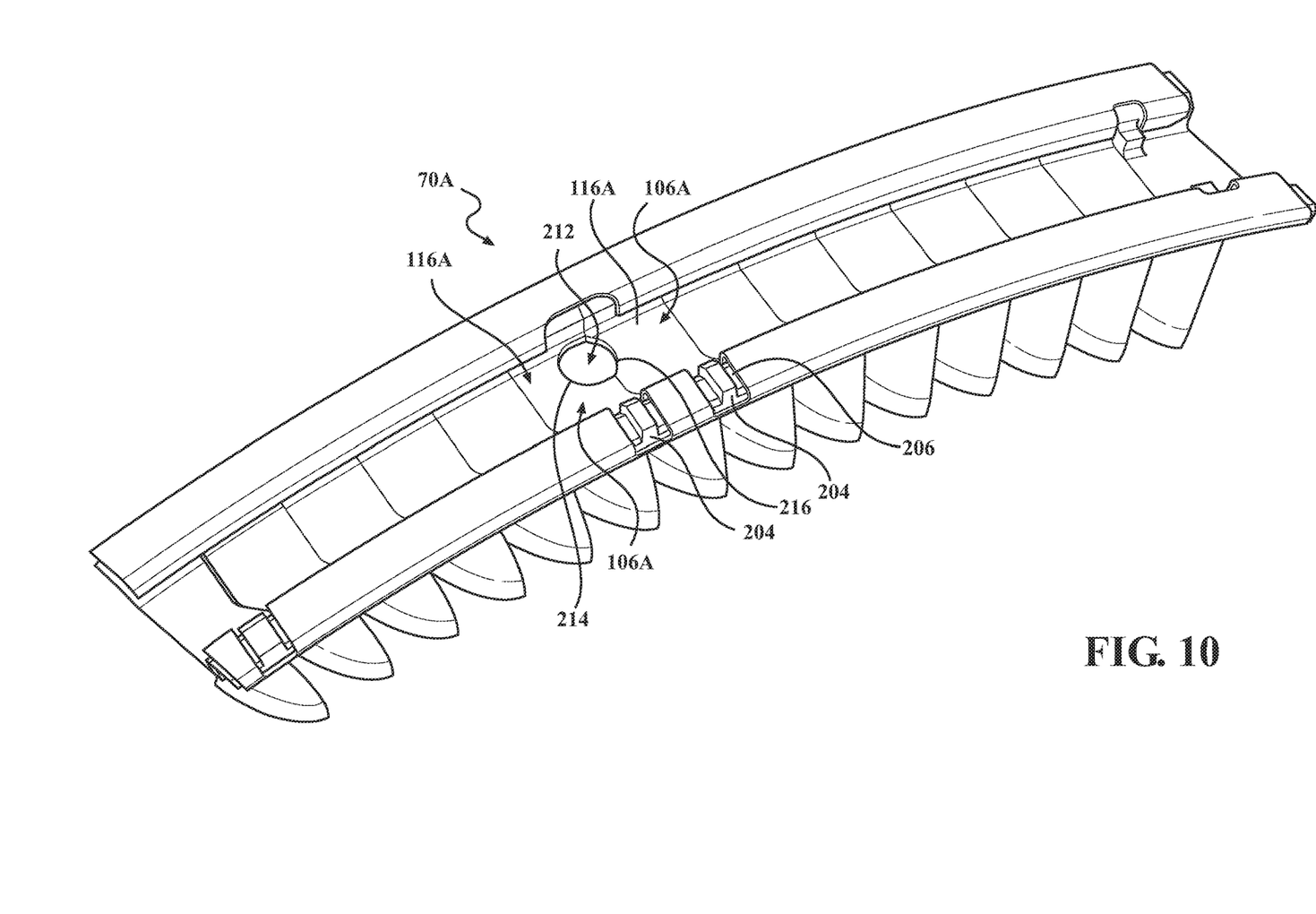
FIG. 10 is a perspective view of a vane cluster according to another disclosed non-limiting embodiment with an access aperture.
Figure 11:
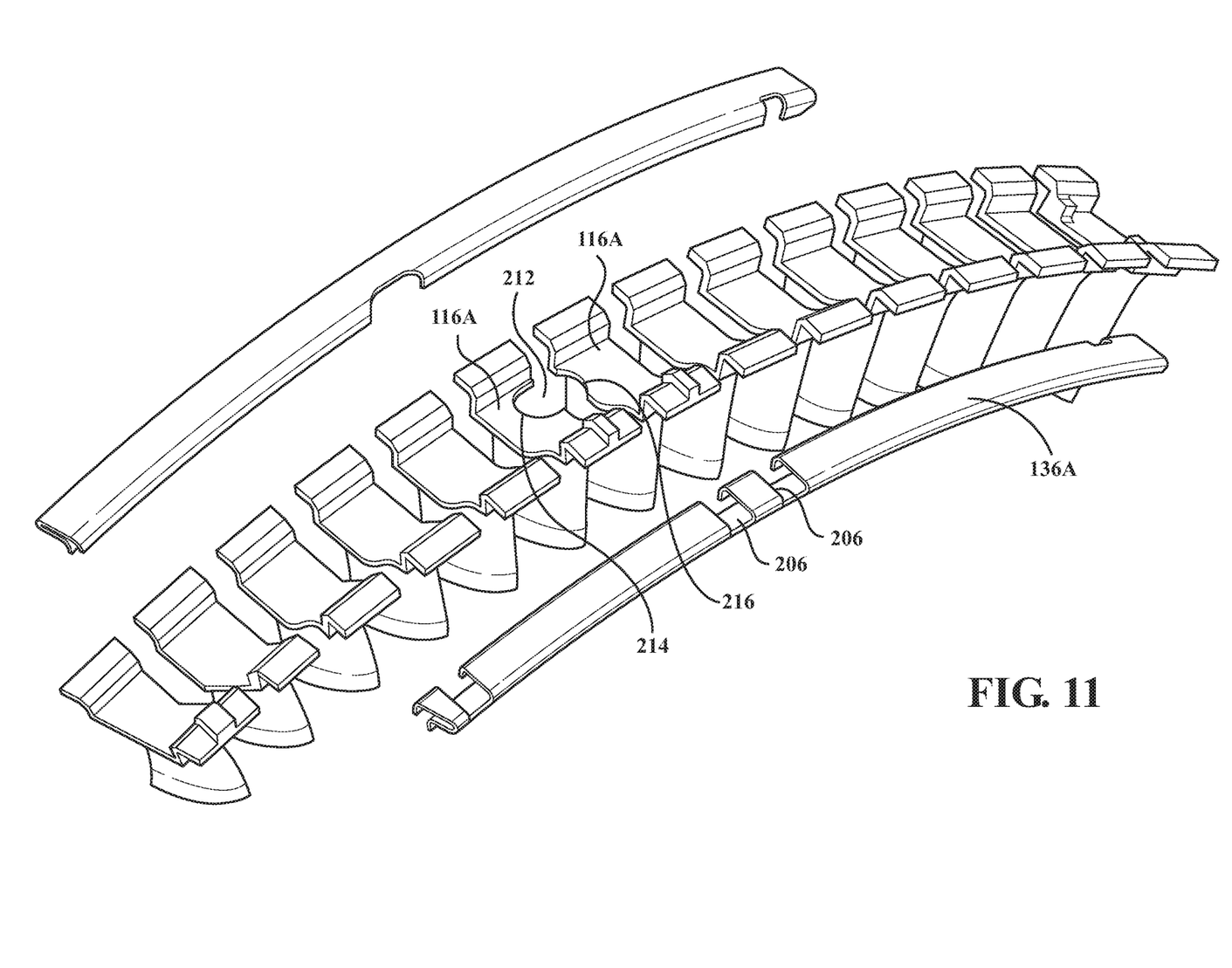
FIG. 11 is an exploded view of the vane cluster of FIG. 10.

With reference to FIG. 10, in another disclosed non-limiting embodiment, a vane cluster 70A includes an aperture 212 such as that which would provide borescope access. The aperture 212 is defined by two of the multiple of base vanes 106A and is formed as a semi-circle 214, 216 (FIG. 11) in the respective base vane outer platform 116A. In this disclosed non-limiting embodiment, lugs 204 are provided on the respective base vane outer platform 116A to facilitate an interface and positional reference with slots 206 in the forward wear liner 136A. That is, the lugs 204 and slots 206 facilitate proper positioning of the apertured base vanes 106A within the vane cluster 70A.

While this disclosure is described for use in a gas turbine engine for an aircraft, it will be understood that this assembly has utility in other rotating machinery applications.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A vane cluster for a gas turbine engine, comprising:
    a first end-of-cluster vane;
    a second end-of-cluster vane, wherein a forward hook of a second vane outer platform is circumferentially longer than an aft hook of the second vane outer platform;
    a neighbor vane adjacent to said second end-of-cluster vane at an interface that includes an angled load interface therebetween; and
    a multiple of base vanes between said first end-of-cluster vane and said neighbor vane, said angled load interface different than an interface between each of said multiple of base vanes.

2. The vane cluster as recited in claim 1, wherein said second end-of-cluster vane includes an anti-rotation lug.

3. The vane cluster as recited in claim 2, wherein said anti-rotation lug radially extends from the second vane outer platform.

4. The vane cluster as recited in claim 3, wherein said anti-rotation lug extends from the forward hook of said second vane outer platform.

5. The vane cluster as recited in claim 1, further comprising a forward wear liner along an outer platform of each of said first end-of-cluster vane, said neighbor vane, said multiple of base vanes, and said second end-of-cluster vane outer platform.

6. The vane cluster as recited in claim 5, further comprising an aft wear liner along said outer platform of each of said first end-of-cluster vane, said second end-of-cluster vane, said neighbor vane and said multiple of base vanes.

7. The vane cluster as recited in claim 6, wherein said first end-of-cluster vane includes a forward lug and an aft lug to respectively engage said forward wear liner and said aft wear liner.

8. The vane cluster as recited in claim 1, wherein the angled load interface is defined by a suction side edge of a neighbor vane outer platform and a pressure side edge of a second end-of-cluster vane outer platform.

9. The vane cluster as recited in claim 1, wherein said angled load interface of said second vane is arranged from an intermediate axial position toward said neighbor vane.

10. The vane cluster as recited in claim 1, wherein said angled load interface of said second vane is arranged from an intermediate axial position toward a leading edge of said neighbor vane.

11. The vane cluster as recited in claim 1, wherein a neighbor vane suction side edge is different than a neighbor vane pressure side edge.

12. The vane cluster as recited in claim 1, wherein the forward hook of the second end-of-cluster vane outer platform includes a radially extending anti-rotation lug that interfaces with a corresponding anti-rotation slot in a forward ring case.

13. The vane cluster as recited in claim 12, wherein a vane shroud geometry at the angled load interface transfers load to the radially extending anti-rotation lug such that the position of each vane remains stable at a desired attitude when assembled.

14. A vane cluster for a gas turbine engine, comprising:
    a first end-of-cluster vane;
    a second end-of-cluster vane including an anti-rotation lug, wherein a forward hook of a second vane outer platform is circumferentially longer than an aft hook of the second vane outer platform;
    a neighbor vane adjacent to said second end-of-cluster vane at an interface that includes an angled load interface therebetween; and
    a multiple of base vanes between said first end-of-cluster vane and said neighbor vane, said angled load interface different than an interface between each of said multiple of base vanes.

15. The vane cluster as recited in claim 14, wherein said interface between each of said multiple of base vanes are identical.

16. The vane cluster as recited in claim 15, wherein an interface between one of said multiple of base vanes and said first end-of-cluster vane is identical to said interface between each of said multiple of base vanes.

17. The vane cluster as recited in claim 16, wherein an interface between one of said multiple of base vanes and said neighbor vane is identical to said interface between each of said multiple of base vanes.

18. The vane cluster as recited in claim 14, further comprising:
    a forward wear liner along an outer platform of each of said first end-of-cluster vane, said neighbor vane, said multiple of base vanes, and said second end-of-cluster vane outer platform; and
    an aft wear liner along said outer platform of each of said first end-of-cluster vane, said second end-of-cluster vane, said neighbor vane and said multiple of base vanes.

19. A method of assembling a multiple of vanes into a gas turbine engine comprising:
    positioning a neighbor vane adjacent to a second end-of-cluster vane at an angled interface that includes an angled load interface therebetween such that a multiple of base vanes are positioned between a first end-of-cluster vane and the neighbor vane, said angled load interface different than an interface between each of the multiple of base vanes, wherein a forward hook of a second end-of-cluster vane outer platform is circumferentially longer than an aft hook of the second end-of-cluster vane outer platform; and anti-rotating the second end-of-cluster vane during operation of the gas turbine engine such that the neighbor vane is loaded axially opposite with respect to the second end-of-cluster vane and at least one of the multiple of base vanes to transfer a load to an anti-rotation lug such that the position of each vane remains stable at a desired attitude.

20. The method as recited in claim 19, further comprising:
anti-rotating the second end-of-cluster vane via the anti-rotation lug that extends radially from the forward hook of the second end-of-cluster vane outer platform.

21. The method as recited in claim 19, further comprising:
retaining each of the neighbor vane, the first end-of-cluster vane, the second end-of-cluster vane, and the multiple of base vanes as a vane cluster.

22. The method as recited in claim 21, further comprising:
mounting the vane cluster within a ring case.

23. The method as recited in claim 22, further comprising:
mounting the first end-of-cluster vane of a first vane cluster adjacent to a second end-of-cluster vane of a second vane cluster.

\* \* \* \* \*